Figure 1:
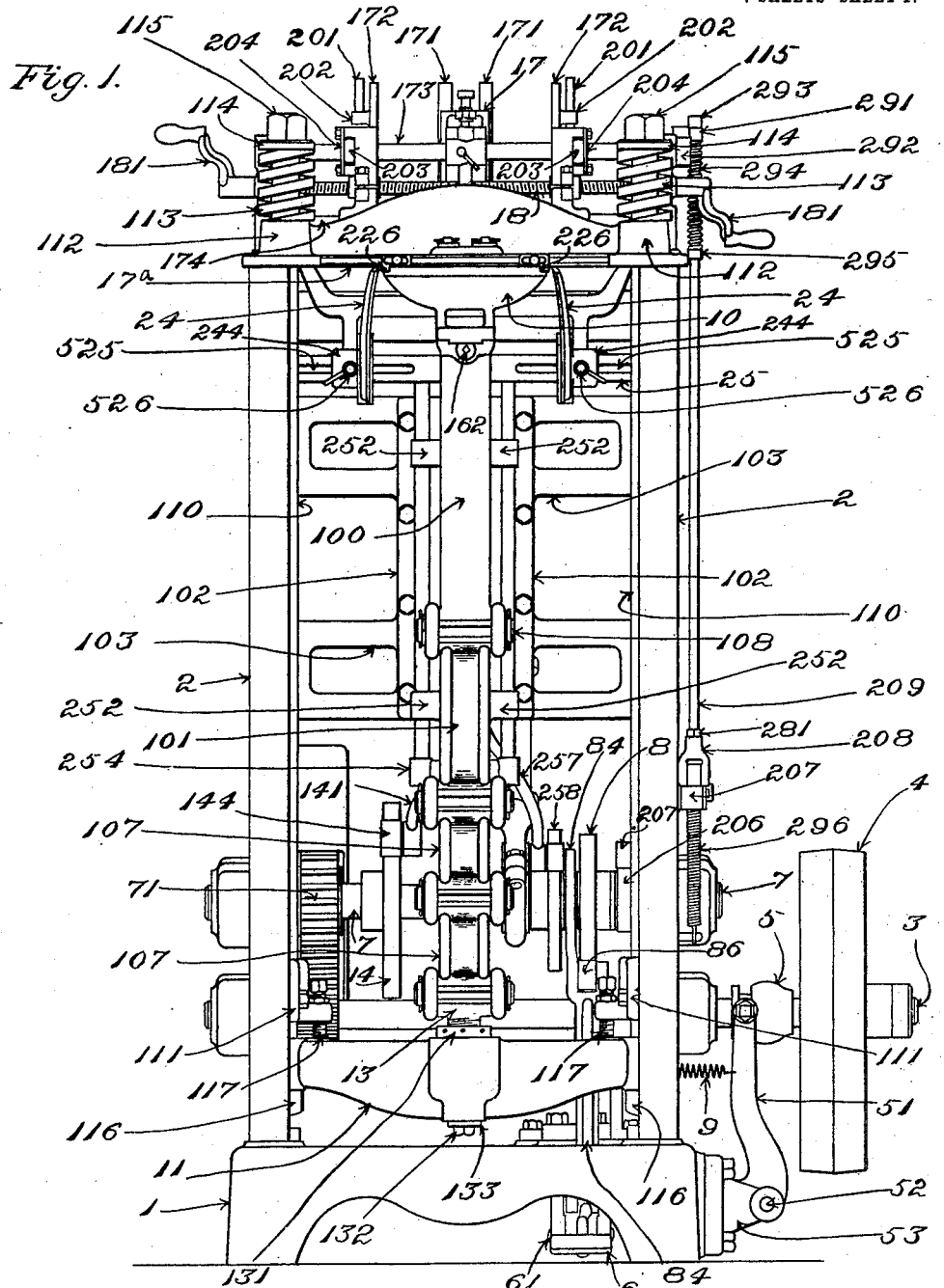

No. 827,762. PATENTED AUG. 7, 1906.
E. H. TAYLOR.
MACHINE FOR MAKING PAPER BOXES.
APPLICATION FILED NOV. 27, 1903.

7 SHEETS—SHEET 1.

Witnesses:
Oscar F. Hill
Aline Tarr.

Inventor:
Eugene H. Taylor
By Macleod Calver & Randall
Attorneys.

No. 827,762. PATENTED AUG. 7, 1906.
E. H. TAYLOR.
MACHINE FOR MAKING PAPER BOXES.
APPLICATION FILED NOV. 27, 1903.

7 SHEETS—SHEET 2.

Witnesses:
Oscar F. Hill
Aline Tarr

Inventor:
Eugene H. Taylor
by Macleod Calver & Randall
Attorneys.

No. 827,762. PATENTED AUG. 7, 1906.
E. H. TAYLOR.
MACHINE FOR MAKING PAPER BOXES.
APPLICATION FILED NOV. 27, 1903.

7 SHEETS—SHEET 3.

Witnesses:
Oscar F. Hill
Edith J. Anderson

Inventor:
Eugene H. Taylor
By Macleod Calver & Randall
Attorneys.

THE NORRIS PETERS CO., WASHINGTON, D. C.

No. 827,762. PATENTED AUG. 7, 1906.
E. H. TAYLOR.
MACHINE FOR MAKING PAPER BOXES.
APPLICATION FILED NOV. 27, 1903.

7 SHEETS—SHEET 4.

Witnesses:
Oscar F. Hill
Robert Wallace

Inventor:
Eugene H. Taylor
by Macleod Calver & Randall
Attorneys.

No. 827,762. PATENTED AUG. 7, 1906.
E. H. TAYLOR.
MACHINE FOR MAKING PAPER BOXES.
APPLICATION FILED NOV. 27, 1903.
7 SHEETS—SHEET 5.
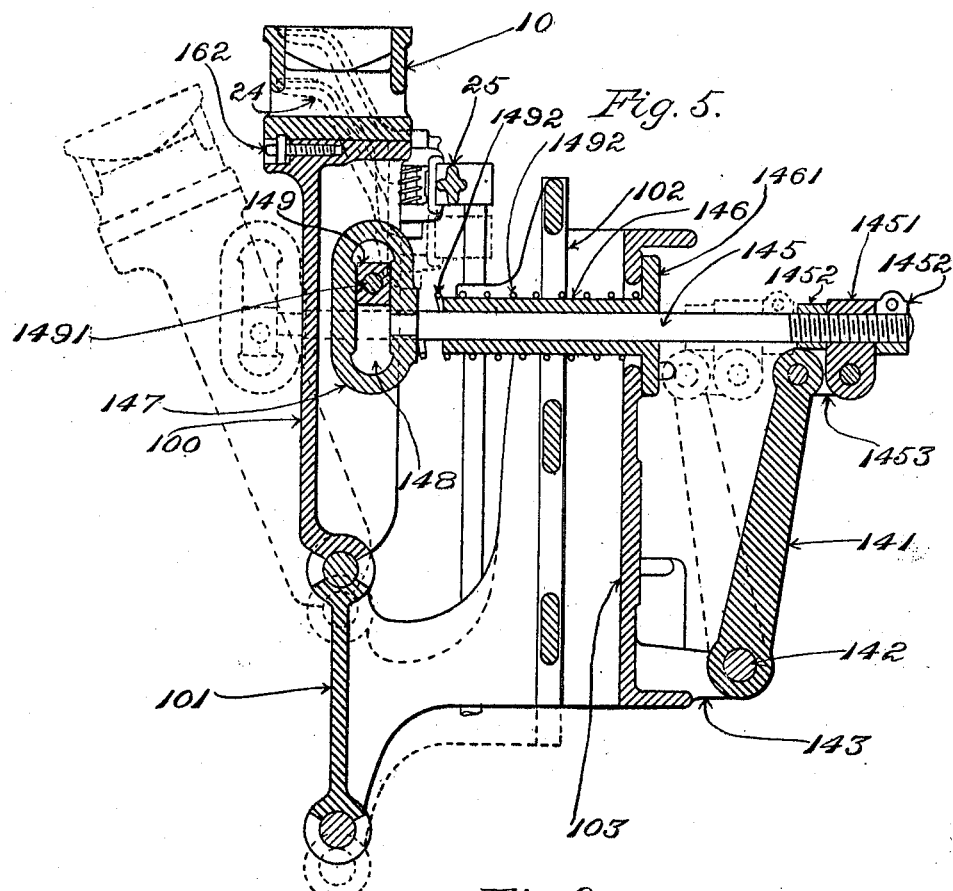
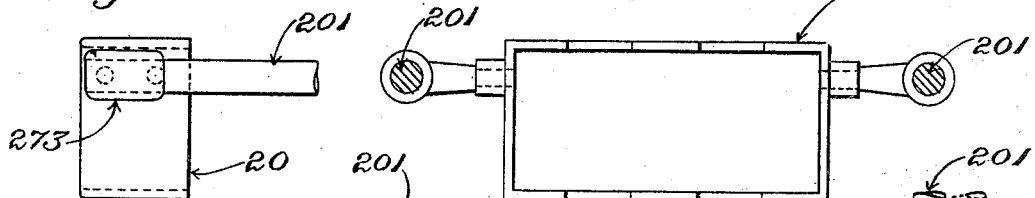
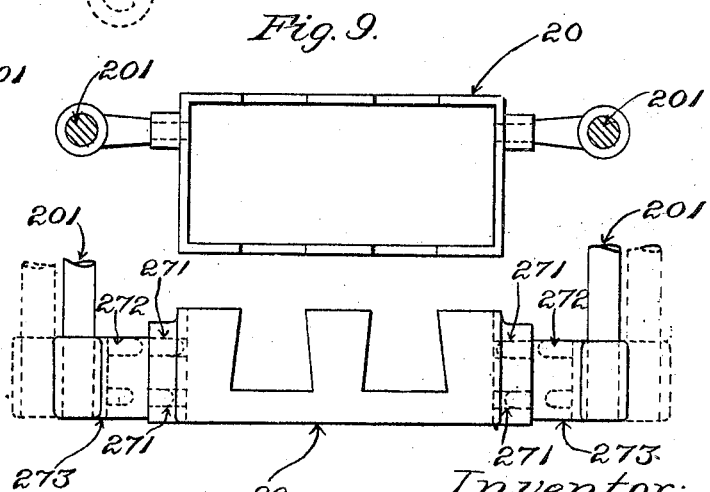
Witnesses:
Oscar F. Hill
Robert Wallace
Inventor:
Eugene H. Taylor
By Macleod Calver Randall
Attorneys.

No. 827,762. PATENTED AUG. 7, 1906.
E. H. TAYLOR.
MACHINE FOR MAKING PAPER BOXES.
APPLICATION FILED NOV. 27, 1903.
7 SHEETS—SHEET 6.
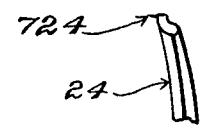
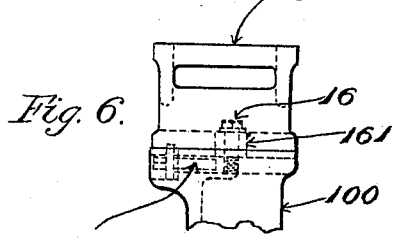
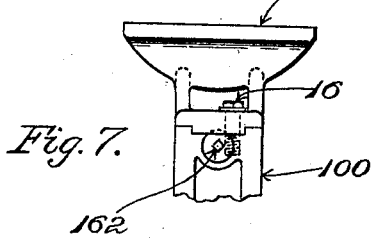
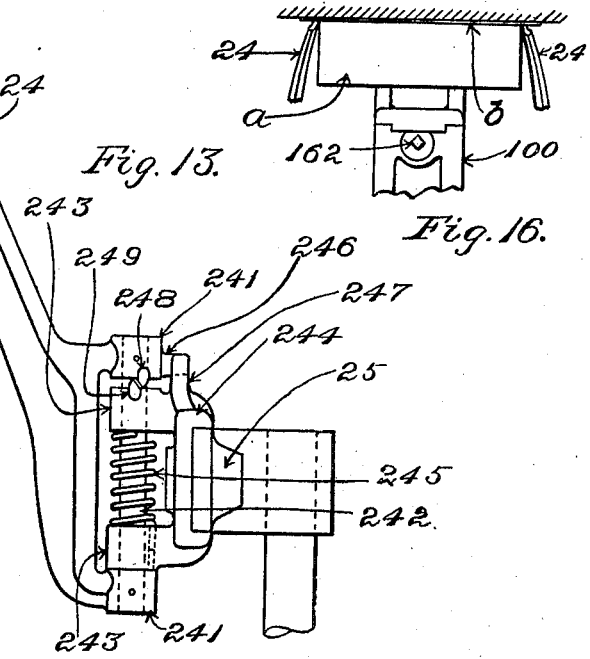
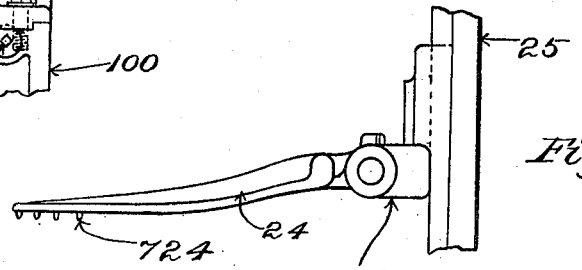
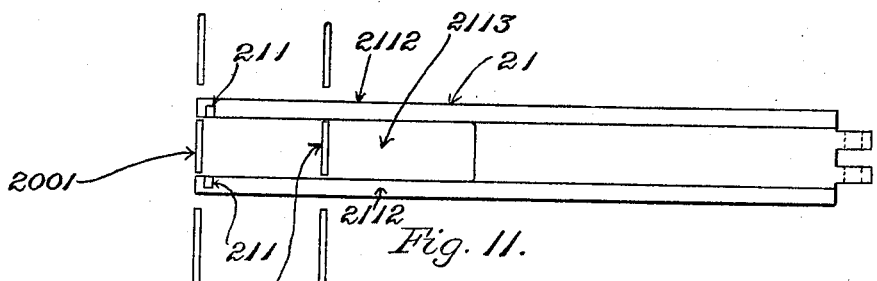
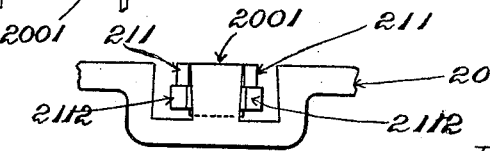
Witnesses:
Oscar F. Hill
Robert Wallace
Inventor:
Eugene H. Taylor
by Macleod Calver & Randall
Attorneys.
THE NORRIS PETERS CO., WASHINGTON, D. C.

No. 827,762. PATENTED AUG. 7, 1906.
E. H. TAYLOR.
MACHINE FOR MAKING PAPER BOXES.
APPLICATION FILED NOV. 27, 1903.
7 SHEETS—SHEET 7.
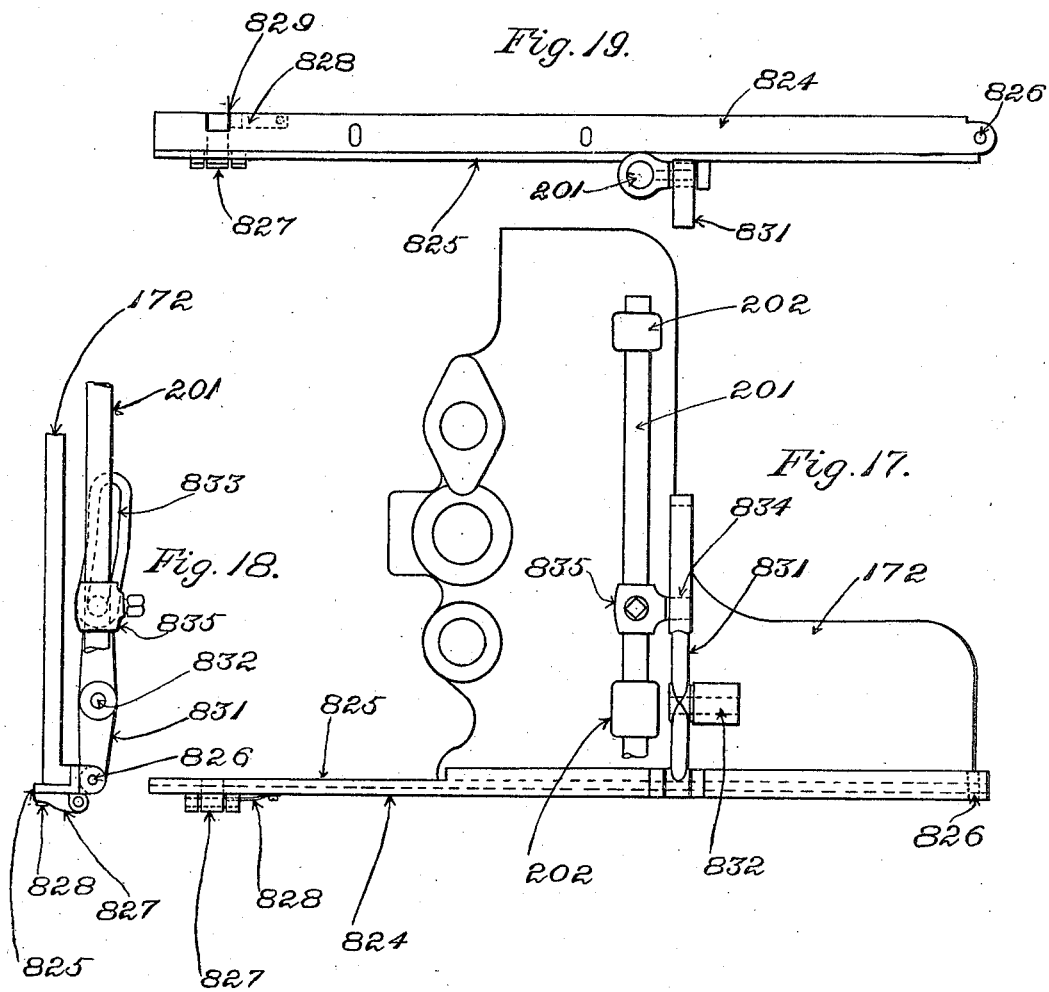
Witnesses:
Oscar F. Hill
Robert Wallace
Inventor:
Eugene H. Taylor
by Macleod Calvert & Randall
Attorneys.

UNITED STATES PATENT OFFICE.

EUGENE H. TAYLOR, OF LYNN, MASSACHUSETTS.

MACHINE FOR MAKING PAPER BOXES.

No. 827,762.　　　　　Specification of Letters Patent.　　　　Patented Aug. 7, 1906.

Application filed November 27, 1903. Serial No. 182,728.

*To all whom it may concern:*

Be it known that I, EUGENE H. TAYLOR, a citizen of the United States, residing at Lynn, in the county of Essex, State of Massachusetts, have invented a certain new and useful Improvement in Machines for Making Paper Boxes, of which the following is a specification, reference being had therein to the accompanying drawings.
The invention relates more especially to machines designed for the purpose of setting up paper boxes by attaching bottoms or tops or ends to the main portions or shells of boxbodies and covers therefor.
The invention comprises improvements in the means and manner of supporting and operating the form upon which the main portion or shell of a box body or cover is mounted in a machine of the class aforesaid for the purpose of having a bottom, top, or end attached thereto, novel means of insuring that the blank for the bottom, top, or end which is to be attached to the said main portion or shell shall be fed accurately into the required position between the head or platen of the machine and the form and shall be held in such position until the main portion or shell applied to the form is compressed against the same, and improvements in the feeder and pasting mechanism.

The features, in general, of the invention are of value for use in attaching bottoms, tops, and ends in most of the usual ways to box bodies and covers of various constructions.
Certain features of the invention in addition are of particular value for use in attaching to the bodies and covers of boxes bottoms and tops which are wider and longer than the said bodies and covers, so that after the said bottoms and tops have been attached the marginal portions thereof project around the bodies or covers. Boxes of the class in which the bottom and top project in this manner are well known and frequently are termed "French-edge" boxes.

The invention will now be described with the aid of the accompanying drawings, which illustrate a machine for setting up paper boxes containing the features of the invention in the best and preferred form of embodiment thereof.

Figure 2:
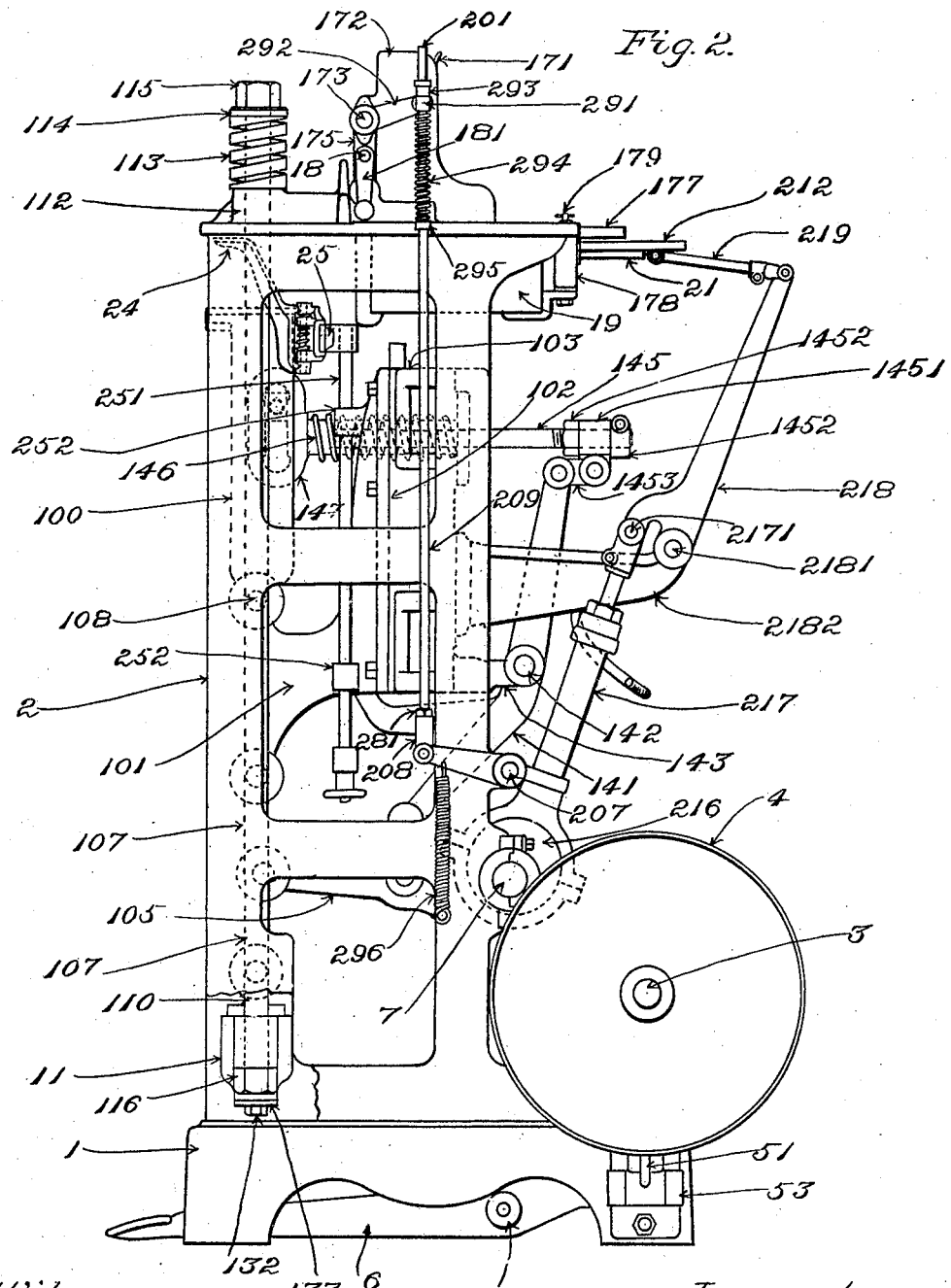
Figure 3:
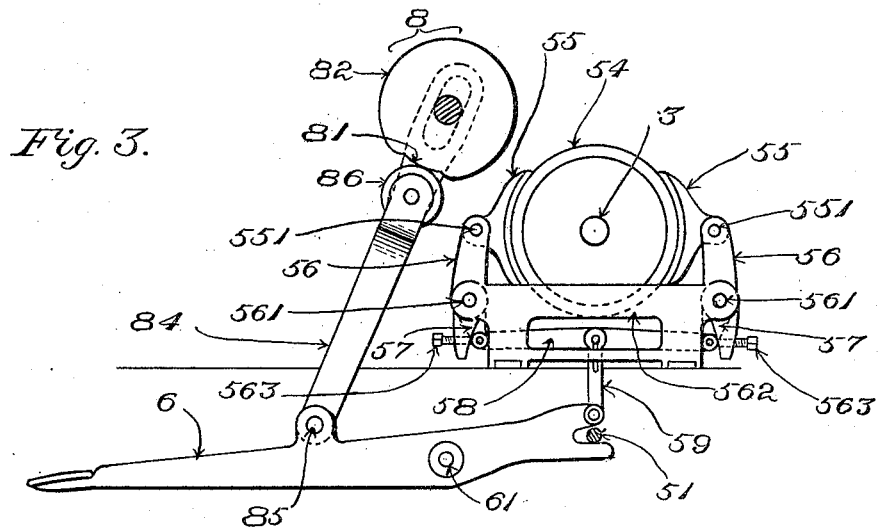
Figure 20:
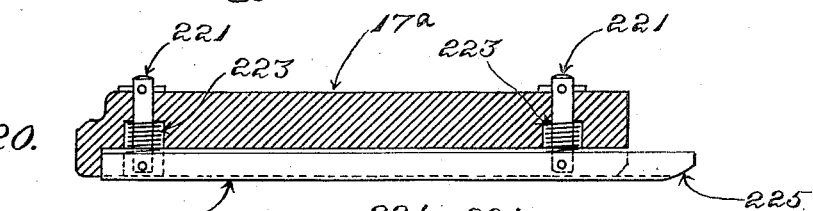
Figure 21:
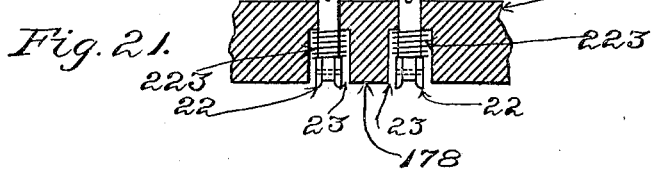
Figure 22:
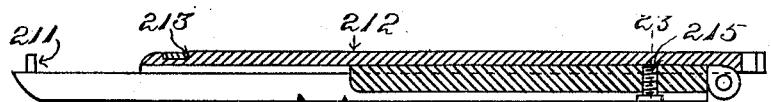
Figure 23:
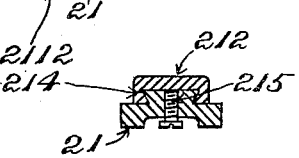
Figure 4:
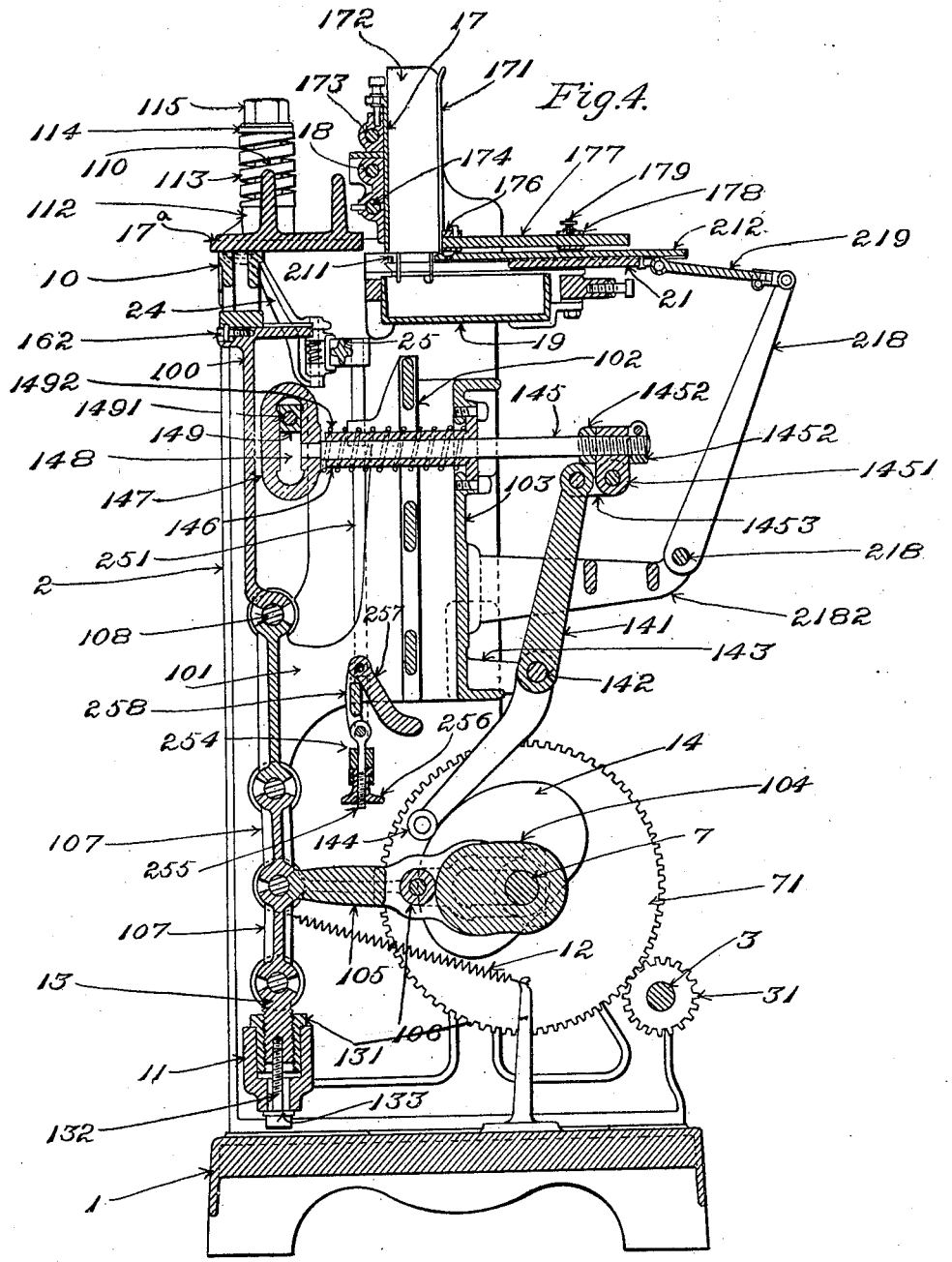

Figure 1, Sheet 1, shows the said machine in front elevation. Fig. 2, Sheet 2, shows the machine in end elevation looking from the right-hand side in Fig. 1. The end of the machine which is represented in Fig. 2 is the driving end thereof. Fig. 3, Sheet 6, is a detail view, partly in vertical section, showing principally the treadle, controller-cam, and parts coöperating with said treadle and controller-cam, and the brake mechanism. Fig. 4, Sheet 4, shows the machine in vertical section on a plane extending from front to rear at the middle of the width of the machine. Fig. 5, Sheet 5, is a similar view, on a somewhat-enlarged scale, showing the form, one of the grippers, and certain of the adjacent parts. This view shows in full lines the movable parts in one position and in dotted lines shows a different position of the same. Fig. 6, Sheet 6, shows the form and part of the support in side elevation; and Fig. 7, same sheet, shows the said parts in front elevation. Fig. 8, Sheet 5, shows in front elevation the paster and certain details of the mechanism for supporting and operating the same. Fig. 9, Sheet 5, shows in plan the parts which are represented in Fig. 8. Fig. 10, Sheet 5, is an end elevation of the parts which are represented in Figs. 8 and 9. Fig. 11, Sheet 6, is a detail view showing in plan the feeder and certain portions of the paster. Fig. 12, Sheet 6, is a view of the parts which are shown in Fig. 11 looking from the left-hand side in Fig. 11. Fig. 13, Sheet 6, is a view showing in side elevation one of the grippers and portions of its supporting and operating mechanism. Fig. 14, Sheet 6, shows in inverted plan the parts which are represented in Fig. 13. Fig. 15, Sheet 6, shows in end elevation the working end of the gripper, which is shown in Figs. 13 and 14. Fig. 16, Sheet 6, is a detail view illustrating the manner of the engagement of the grippers with the marginal portions of a bottom projecting beyond the sides of the form, as in the case of a Frenchedge box. Fig. 17, Sheet 7, shows in side elevation one of the side pieces of the hopper for bottom blanks with another arrangement of gripper and gripper-actuating devices. Fig. 18, Sheet 7, shows portions of the parts of Fig. 17 looking from the left-hand side in the latter view. Fig. 19, Sheet 7, shows in plan certain of the parts of Fig. 17. Fig. 20, Sheet 3, represents the head or platen in vertical section on a plane extending from front to rear in the machine and shows more particularly one of the presser-shoes. Fig. 21, Sheet 3, is a view of the head or platen in vertical section on a plane at right angles to that of Fig. 20. Fig. 22, Sheet 3, is a view of the feeder in longitudinal section. Fig. 23, Sheet 3, is a view in vertical cross-section on the plane indicated by the dotted line 23 23 in Fig. 22.

For convenience in the course of the following description, except where explicit distinction is necessary to be made, the body of a box and its cover will respectively be comprehended under the term "box," the main portion or shell of a box-body and that of a cover will respectively be comprehended under the term "body," and the bottom, top, or end will be understood to be comprehended by the term "bottom."

Having reference more particularly to Figs. 1, 2, 3, Sheets 3 and 4 of the drawings, the frame in general of the machine, which is shown in the drawings, comprises the bed 1 and the opposite vertical side frames 2 2. A power or driving shaft 3 is located at the rear of the machine, it being mounted in bearings with which the side frames 2 2 are provided adjacent the bed 1. For the purpose of communicating driving power to the shaft 3 a driving-pulley 4 is mounted upon the said shaft, it being loose thereon, and in connection with the said driving-pulley a suitable clutch is provided, the operating sleeve or cone of which is represented at 5, Fig. 1. For the purpose of enabling the said sleeve or cone 5 to be actuated so as to render the clutch operative and inoperative, as required, it is engaged by a fork upon the upright arm of an actuating bell-crank 51, the latter being pivoted at 52 upon the stand or bracket 53, that is attached to one end of the bed 1. The inwardly-extending horizontal arm of the said actuating bell-crank is engaged by the rear arm of a treadle-lever 6, Figs. 1, 2, and 3, Sheet 3, the forwardly-extending arm of which latter extends to the front of the bed 1 into position to be acted upon by the foot of the operator, the said treadle-lever being pivoted at 61 beneath the bed. Depression of the forward arm of the treadle by the operator will cause the bell-crank 51 to be moved, so as to close the clutch, whereby the driving-pulley 4 will be clutched to the shaft 3, so as to rotate the latter. The treadle and bell-crank are moved in the opposite direction to open the clutch by means of a contracting spiral spring 9, Fig. 1, the latter having one extremity thereof connected with the vertical arm of the bell-crank 51, the other extremity of the said spring being connected with a suitable fixed point of attachment. In connection with the power or driving shaft 3 a brake mechanism is employed. A suitable and convenient arrangement of the said brake mechanism is shown in detail in Fig. 3, Sheet 3, of the drawings. In the said figure a brake-wheel or stop-pulley 54 is mounted upon the power or driving shaft 3 and fast therewith. At the periphery of the said brake-wheel or stop-pulley 54 brake-shoes 55 55 are arranged opposite each other, the said brake-shoes being pivotally connected at 551 551 with the upwardly-extending arm of levers 56 56, which are pivotally mounted at 561 561 upon a stand at 562, which is located adjacent the said brake-wheel or stop-pulley. Other arms 57 57 are pivotally connected at 561 561 with the said stand 562 and extend downward adjacent to the lower arms of the levers 56 56. The arms 57 57 are connected with each other by a toggle 58, the joint of which is connected by a link 59 with the rear arm of the treadle 6. The arrangement shown in Fig. 3, Sheet 3, is such that when the rear arm of the treadle 6 is depressed—as, for instance, when the bell-crank 51, engaging with the treadle-lever, as shown in Fig. 3, is moved by the spring 9 in the direction to shift the clutch-operating cone or sleeve 5 to open the clutch the toggle is straightened, so as to move the arms 57 57 away from each other, and thereby operate the brake-levers 56 56 to press the brake-shoes 55 55 against the periphery of the brake-wheel or stop-pulley 54, thereby holding the said brake-wheel or stop-pulley and driving-shaft 3 from rotation. When, also, the forward arm of the treadle 6 is depressed by the operator, so as to operate the bell-crank 51 to move the cone or sleeve 5 in the direction to close the clutch, and thereby couple the driving-pulley 4 to the main or driving shaft 3, the toggle is bent, so as to draw the arms 57 57 toward each other, thereby relieving their pressure against the brake-levers 56 56 and permitting the pressure of the brake-shoes 55 55 against the periphery of the brake-wheel or stop-pulley 54 to relax, thus relieving the driving-shaft from the action of the brake. For the purpose of enabling the braking action to be adjusted as required adjusting-screws 563 563 are applied to the downwardly-extending arms of the brake-levers 56 56 for engagement with the actuating-arms 57 57.

The various parts of the machine which are involved in the functional operation of the latter are actuated in the present instance through operative connections with a main or cam shaft 7. The said cam-shaft 7 is mounted in bearings with which the side frames 2 2 are provided at the rear side of the machine, and in Fig. 4 of the drawings it is shown as driven from the power or driving shaft 3 by means of a spur-pinion 31 upon the latter meshing with a spur-gear 71 upon the main or cam shaft. Normally the driving-shaft 3 and the cam-shaft 7 stand at rest, and they are set in motion, for the purpose of communicating movement to the working parts, by depressing the front arm of the treadle 6, so as to clutch the driving-pulley 4 to the driving-shaft 3. For the purpose of holding the brake mechanism out of action and keeping the driving power on after the brake has been disengaged and the clutch has been closed by the operator, and thereby rendered operative to transmit driving power to the driving-shaft 3 until after one complete cycle of operations in the machine has been finished, without requiring the attention of the operator and of then causing the machine automatically to come to rest, a controller-cam 8, Fig. 1, Sheet 1, and Fig. 3, Sheet 3, is mounted upon the cam-shaft and is made fast therewith. The said cam has the depressed portion 81 and a raised concentric peripheral portion 82. In order that the controller-cam 8 may control the action of the driving connections, a bar 84 is connected pivotally at 85 with the treadle-lever, its upper end being forked to fit the cam-shaft at one side of the controller-cam, the said bar being provided with a roll 86, which is engaged by the controller-cam. In the normal position of rest the depressed portion 81 of the controller-cam is presented to the roll 86, as in Fig. 3, Sheet 3. When the forward arm of the treadle 6 is pressed down to move the treadle, so as to throw off the brake and turn the actuating bell-crank 51 in the proper direction for closing the clutch to ship on the driving power, the first portion of the rotation of the shaft 7 will present the raised portion of cam 8 to the pin or roll 86. By its engagement with the said pin or roll the said raised portion will hold the treadle depressed and insure that the brake shall be kept off and the clutch closed until by the continued rotation of the cam-shaft the rear end of the said concentric portion passes the roll. As this occurs the bar and treadle will be free to rise if the same are not held down by the pressure of the operator's foot upon the treadle, which will permit the clutch to open, so as thereby to unship the driving power and cause the brake to be applied, so as to arrest the movements of the working parts.

It is well understood that in the operation of joining a bottom or end to the body of a box the said body is applied to the exterior of a suitable form, and a bottom piece or end blank having had paste or glue applied thereto is fed into proper position for being joined to the body, after which the body and bottom piece or end blank are pressed together by relative movement of the form and an adjacent head or platen with respect to each other, whereby the said body and the bottom piece or end blank are caused to become united, after which the body, with attached bottom or end, is removed from the form. In the drawings a form such as that to which reference has just been made, is shown at 10, Fig. 1, Fig. 5, Sheet 5, and Figs. 6 and 7, Sheet 6, and the head or platen with which the said form is caused to coact is shown at 17$^a$, Figs. 1 and 4. In the present instance the head or platen is mounted upon the upper ends of the side frames 2 2 and is fixedly connected therewith, and the form 10 is made movable toward and from the head or platen. I therefore term the head or platen "relatively immovable," because it is given no positive movement of its own in the operation of applying the bottom to the box-body, as is the case with the form 10, although the head or platen is arranged, as will be later described, to yield slightly in order that the pressure applied to the box by the box-form during the process of attaching the bottom may be uniform, and so that breakage of the parts may not result. In practice the form corresponds in shape and size with the box which is intended to be made, and when boxes of a different shape and size are to be made a suitable form is substituted. The form is mounted removably upon a form-carrier, which is arranged and operated to move toward and from the head or platen. The construction of the form-carrier and the manner and means of mounting and operating the same may vary in different embodiments of the invention. Herein the form-carrier is designated 101. It is constructed as a slide, which for some reasons I prefer in practice and is mounted to move vertically in guides at 102 102, Figs. 1, 2, and 4, that are provided at the middle of the width of the machine in what is termed a "spider" 103. The said spider is attached to the side frames 2 2 and extends from one of the side frames to the other thereof, whereby it is securely supported. For the purpose of transmitting power to the form-carrier 101 in order to move the same to raise the form toward the under side of the head or platen 17$^a$ the said form-carrier 101 is operatively connected with the cam-shaft 7.

The operating connections of the form-carrier may be constructed and arranged variously, as deemed advisable; but preferably I employ a cam 104, Fig. 4, which is fast upon the cam-shaft 7, and a bar 105, having one end thereof slotted to fit and slide upon the cam-shaft at one side of the said cam. The bar 105 has mounted thereon a pin or roll 106 to engage with the periphery of the cam 104. The other end of the said bar is in connection with the meeting ends of links 107 107, forming a toggle, the opposite end of the upper one of the said links being connected with the lower end of the form-carrier 101 and the opposite end of the lower link being connected with an abutment which is provided on a cross-bar 11, Figs. 1, 2, and 4, said cross-bar 11 extending across the front of the machine between the side frames 2 2 adjacent the bed 1. A contracting spiral spring 12, having its rear extremity connected with a post that is carried by the bed 1 and its forward extremity connected with the lower toggle-link, operates to hold the pin or roll 106 pressed against the periphery of cam 104 and acting in opposition to the said cam operates, when permitted so to do by the said cam, to cripple or bend the toggle as required in order to occasion the descent of the form-carrier and form.

In order to insure that a bottom and the portion of a body with which it makes contact shall be fully compressed together to an extent proper to insure that they shall become effectively united together at the place or places of contact with each other, the means for supporting and operating the form is proportioned and adjusted in practice usually to cause the form in moving toward the platen to just touch the latter or to approach the same to within less than the minimum thickness of the bottoms or end blanks which are being operated upon. This guards against lack of effective compression in case bottoms which are lacking in thickness are presented in position to be joined to the bodies. A relief device is provided for the purpose of permitting the movement of the form toward the platen to terminate as soon as the compression of the stock intervening between them passes above the predetermined degree. The said relief device accommodates variations in the thickness of the stock and platen, and thereby obviates strain or breakage of the machine. The pressure relief may be provided for in various manners, usually by means of a spring or springs the tension of which is the measure of the degree of the compression of the stock against the platen. As soon as the resistance which the stock offers to further compression becomes sufficient to overcome the tension of the spring the said resistance arrests the approach of the form to the platen. The spring or springs may be variously applied and combined with the platen and its operative connections in practice. Herein springs are employed in connection with the cross-bar 11, which latter is mounted in a manner enabling it to yield as soon as more than the predetermined degree of resistance is encountered by the form 10 in completing its compressing stroke toward the head or platen 17ª. Thus, as shown, the cross-bar 11 is attached to the lower ends of slide-rods 110 110, Figs. 1, 2, and 4. These slide-rods are fitted near the said lower ends to guides 111 111, Fig. 1, with which the opposite side frames 2 2 are provided. The upper ends of said slide-rods pass through guides 112 112, with which the head or platen 17ª is furnished at the opposite sides of the machine, and the portions of the slide-rods which project above the latter guides are surrounded by expanding spiral springs 113 113, the said springs being confined between the upper ends of the guides 112 112 and the under sides of washers 114 114, which are placed upon the slide-rods 110 110 and secured in place thereon by nuts 115 115. The cross-bar 11 is connected with the lower ends of the slide-rods by passing the slide-rods 110 110 through holes in the opposite ends of the cross-bar, the latter ends resting upon nuts 116 116, which are turned onto the threaded portions of the said lower ends of the slide-rods. The normal position of the cross-bar 11 under the lifting action of the springs 113 113, that are applied to the slide-rods 110 110, is determined by adjustable stops which are constituted by set-screws 117 117, Fig. 1. These set-screws are fitted to holes which are tapped vertically through lugs projecting from the lower guides for the slide-rods, and their lower ends engage with the upper side of the cross-bar adjacent the ends thereof in the rise of the said cross-bar. The set-screws are provided with lock-nuts of usual character.

For the purpose of enabling adjustment to be effected when required, in view of a change from one thickness of stock to another, the post 13, which is carried by the cross-bar and which serves, as has been described, as the abutment for the toggle which is connected with the form-carrier, is made vertically adjustable by the improved means which will now be described with reference to Figs. 1, 2, and 4. The said post is screw-threaded exteriorly. It is fitted within an interiorly-grooved sleeve 131, that is applied to a vertical socket or bearing at the middle of the length of the cross-bar. (See more particularly Figs. 1 and 4.) Rotation of the said sleeve 131 within the said socket or bearing will adjust the post vertically. In order to hold the parts in proper position in connection with the cross-bar 11 and to prevent accidental loss of adjustment, a hole is formed through the cross-bar, and through the said hole is passed loosely the stem of a screw 132. The upper end of the said screw enters a threaded hole that is tapped in the lower end of the post 13. Between the head at the lower end of the screw and the under side of the cross-bar a washer 133 is placed. The said screw is loosened in order to enable the post to be adjusted by rotating the sleeve. After such adjustment has been effected so as to give the proper height to the post the screw is tightened. Thereby the threads of the post and sleeve are clamped together so as to lock them from relative movement with respect to each other, and the shoulder at the top of the sleeve is also drawn down into firm contact with its seat upon the upper side of the cross-bar.

Certain of the features of my invention which are described herein admit of being employed usefully in connection with a form and form-carrier which are combined, arranged, and operated in any usual or approved manner. One feature of the present invention, however, consists in making provision for facilitating the application of the body of a box to the form prior to having a bottom attached thereto, and the removal of the body with attached bottom after the attaching operation has been performed. Or dinarily, heretofore, the separation of the form and head or platen from each other in machines of the class to which my invention relates has been affected through relative movement in a right line, the parts simply being separated and remaining in line with each other. In machines in which the separation is effected in this manner it is necessary when operating upon box-bodies which completely encircle the form to separate the form and head or platen from each other to an extent slightly greater than the height of the sides of the box-body in order to permit the box-body to be applied to the form and subsequently removed therefrom. Such a box-body cannot be placed upon the form by a horizontal movement from the front or rear, but requires to be passed over the form between the latter and the head or platen and slipped down upon the form. Similarly in order to remove a box-body after having had the bottom attached thereto it must be lifted off the end of the form and then be withdrawn from between the form and the head or platen. In conformity with one portion of the invention I construct and combine the parts of a machine of the class in question, so that the form when separated from the head or platen shall be caused to assume a position out of direct line with the latter. Causing the form to assume a position out of direct line with the head or platen when the form and head or platen are separated from each other renders it much more convenient for the operator to place a box-body upon the said form preliminary to having a bottom attached thereto and to remove the body after the said bottom has been attached than in machines in which the form always remains in direct line with the head or platen. By arranging the form to be shifted into and out of direct line with the head or platen it is rendered possible to place the box-body upon the form and remove the same therefrom without causing it to pass bodily between the form and the head or platen, and thus the extent of the movement of the parts from and toward each other is enabled to be materially reduced. These differences permit a higher speed of operation to be maintained than otherwise would be practicable, with corresponding increase of production. The relative movement of the form out of and into direct line with the head or platen may be secured in several different ways within the spirit of the present invention. Herein it is secured by movably connecting the form with the form-carrier 101. The movable connection also may be effected in different ways within the spirit of the invention. Preferably I secure the desired movability by mounting the form upon a form-supporting post 100 and pivotally hanging the said post at its lower end, at as 108, to the forwardly-projecting portion of the form-carrier. In a machine on the order of that which is shown in the drawings the normal position of the post, which it occupies during the rise of the form-carrier for the purpose of effecting the compression against the under side of the head or platen, is vertical, as shown in Figs. 1, 2, and 4, and in full lines in Fig. 5, and after the form-carrier has been moved in a direction to separate the form from the head or platen the form-supporting post is swung forward so as to cause the form to assume a forwardly-inclined position, as in dotted lines in Fig. 5. In the present instance the movement into the latter position carries the form out from under the platen. The forward inclination of the form toward the operator favors the application of the box-body thereto and its removal therefrom. This inclination in itself is useful and of value and may be provided for separately in various ways within the spirit of one portion of the invention.

In a partially-automatic machine the form may be shifted manually into and out of direct line with the platen and into and out of its inclined position. Preferably, however, I combine with the form means whereby the same has the shifting movements communicated thereto automatically at the required time in the working of the machine. The shifting means may vary in practice. Herein it comprises, essentially, a cam 14, Fig. 4, on the cam-shaft 7 of the machine, operative connections between the said cam and the post 100, and a spring acting in opposition to the cam. The said connections include a lever 141, which is mounted pivotally at 142 in a stand 143, projecting from the rear side of the spider, as shown most clearly in Figs. 4 and 5, the said lever carrying on the lower arm thereof a pin or roll 144, Fig. 4, which is engaged by the periphery of the said cam. The lever is connected with the post 100 by means of a slide rod or bar 145, that is fitted to a guide-sleeve 146, Figs. 4 and 5, fixed in the upper part of the spider. The rear end of the slide rod or bar 145 is joined operatively to the upper arm of the lever 141, as will presently be described. The front end of the slide rod or bar 145 is joined operatively with the post by means of a head 147, Figs. 2, 4, and 5, with which the said end is provided, the said head having a vertical slot 148, in which is received a block 149 or the like, which is supported within the open back of the post between the opposite side portions or cheeks of the post. The said block is held in place within the post by means of a pin or bolt 1491, Figs. 4 and 5, which passes through the said side portions or cheeks and the block. By the action of the cam against the pin or roll 144 the form is moved into its normal position in line with the head or platen. It is moved out of direct line with the head or platen and into its inclined position under the control of the said cam by means of an expanding spiral spring 1492, which latter is compressed between the rear side face of the head 147 and a collar 1461, Fig. 5, on the guide-sleeve 146. This spring acts with a tendency to press the bar or rod endwise toward the front of the machine. It operates in opposition to the cam 14, and when permitted to act it serves to move the post and form forward into the position which is indicated by the dotted lines in Fig. 5. The spring also serves to take up all backlash between the cam and the slide rod or bar.

It is important that when the form and head or platen come together the upper surface of the form should be parallel with the opposing surface of the head or platen. In order to provide for adjustment of the form to secure this parallelism, as well as to enable the front edge of the form to be brought into the required position with reference to the front edge of the platen, the rear or power end of the slide rod or bar 145 is connected adjustably with the upper arm of the actuating-lever 141 therefor, so as to enable the slide rod or bar to be adjusted lengthwise to thereby permit the desired normal position of the form to be secured. By means of this adjustment the post and form may be shifted relative to the pivot of the post until the form is brought into the required relation to the head or platen. In the present instance the said power end of the rod or bar is screw-threaded, (see Figs. 2, 4, and 5,) and upon the same is fitted a block 1451 between adjusting-nuts 1452 1452, the outer one of said nuts being split and provided with a clamping-screw by means of which it may be tightened upon the threaded portion of the rod or bar to lock the same in position upon the latter. The block 1451 is connected by a short link 1453 with the upper arm of the actuating-lever 141. By loosening the clamping-screw of the outer nut 1452, so as to permit the said nut to be turned upon the threaded portion of the rod or bar 145, and then turning the two nuts upon the said threaded portion in the required direction to the required extent, the slide-rod will be shifted lengthwise and the position of the post and form with reference to the vertical and with reference to the under surface and front edge of the platen may be adjusted as desired.

The form 10 is mounted upon the upper end of the swinging post with capacity for separate adjustment on the said upper end. The foot of the form is fitted to guide-surfaces on the upper end of the post, as shown in Fig. 1 and in Fig. 7, Sheet 6, and is capable of movement thereon in a direction from front to rear in the machine. For the purpose of holding the form in place a screw 16, Figs. 6 and 7, Sheet 6, passes vertically from the inside of the form through a slot 161, Fig. 6, in the bottom of the form into the upper end of the post. The slot extends in a direction from front to rear in the machine, and for convenience in making adjustment of the form an adjusting-screw 162, Figs. 1, 4, 6, and 7, is fitted to a threaded hole that is tapped in the upper part of the post, a collar upon the said screw taking into a notch or groove in the under side of the form.

The machine is shown provided, as usual, with means for applying paste or other cementitious material to the bottom blanks to prepare them for adhering to the box-bodies and with means for feeding them successively into position between the form and the head or platen. These means may vary in practice and may be of any suitable known or approved character and construction, although preferably certain improvements which I have invented and to which reference will presently be made are embodied in connection with the pasting and feeding devices. The hopper which is shown in the drawings is of a well-known construction. It comprises, essentially, a front piece 17, Figs. 1 and 4, a pair of back pieces 171 171, and opposite side pieces 172 172. The front piece 17 is mounted upon and attached to the middle of the length of a pair of rods 173 174, Figs. 1, 2, and 4, that extend transversely above the top of the machine, the said rods 173 174 being supported at their ends by stands 175, Fig. 2, which are located at the opposite sides of the machine and mounted in convenient manner upon the fixed framing of the machine. The back pieces 171 171 are attached to a cross piece or head 176, Fig. 4, at the front end of a horizontal rod 177. The said rod 177 passes through an eye in a small stand 178, forming a part of the fixed framework at the top of the machine. The said rod 177 is movable lengthwise through the said eye in order to enable the back pieces of the hopper to be adjusted to suit the width of the blanks, and it is secured in the desired position of adjustment by means of a clamping-screw 179, which is applied in connection with the said eye. The side pieces 172 172 of the hopper are fitted to the transverse rods 173 174 with capacity to slide thereon toward and from each other for the purpose of enabling them to be adjusted to suit the length of the blanks. As heretofore, a right-and-left screw 18 is provided in order to enable the said side pieces to be simultaneously shifted in opposite directions and equally with each other toward and from the middle of the machine. The said screw 18 is mounted in bearings in the stands 175 at the opposite sides of the machine and is provided with a crank-handle 181 at each end of the same for convenience in turning it. The pan 19 for containing the paste or other cementitious material is arranged, as heretofore, below the hopper, and it is supported by the fixed framework of the top of the machine. The paster 20, Figs. 8, 9, and 10, by means of which the paste or other cementitious material is transferred from the said pan 19 to the bottom or end blanks, is carried, as heretofore, by the lower ends of vertical rods 201 201, which are mounted to slide through guides 202 202, Fig. 1, that are carried by the side pieces 172 172 of the hopper. For the purpose of transmitting movement to the said rods 201 201 in actuating the paster, arms 203 203, Fig. 1, are splined upon the upper one of the transverse rods, the said arms being engaged at their rear ends with the vertical rods, and with the said upper transverse rod is operatively combined means for working the same. In order to cause the arms 203 203 to move transversely in unison with the side pieces of the hopper as the said side pieces are adjusted transversely of the machine, each side piece is provided with upper and lower projections extending above and below the hub portion of the corresponding arm, and a plate 204, Fig. 1, having a hole therethrough through which the transverse rod 173 passes, is located at the outer side of the arm and secured to the ends of the said projecting pieces by screws. The rod 173 is rocked through suitable connections with the cam-shaft 7, such connections comprising in the present instance a cam 206, Fig. 1, upon the cam-shaft, a rocker 207, Fig. 2, which is journaled in a bearing that is provided on one of the side frames 2, the said rocker 207 having an arm provided with a pin or roll which is engaged by the periphery of the said cam and a second arm having pivoted thereto a yoke 208, Figs. 1 and 2. This yoke has a threaded hole tapped therein which receives the threaded lower end of a connecting-rod 209. The upper end of the said connecting-rod 209 passes through a hole in a block 291, that is swiveled upon an arm 292 upon the outer end of the transverse rod 173. The connecting-rod has a head or collar 293 above the said swiveled block 291, while below the latter the connecting-rod is encircled by an expanding spiral spring 294, which is compressed between the said block and a collar 295, that is pinned in place upon the shaft. The said spring acts expansively to hold the swiveled block 291 against the under side of the collar 293 upon the upper end of the connecting-rod. A contracting spiral spring 296, Figs. 1 and 2, having one extremity thereof connected with the second arm of the rocker and the other with a fixed point of attachment on the framework of the machine, operates with a tendency to move the said rocker in opposition to the cam. Through the connections described the paster is reciprocated vertically. The spring 294 is interposed in the train of connections in order to cause the paster to be carried with yielding force against the under side of the bottom blank in the hopper. The spring is employed also in order that it may yield so as to avoid breakage or other injury in case through accident the feeder should occupy a position to obstruct the movement of the paster as the latter rises toward the bottom blank in the hopper. The connecting-rod 209 is connected, as described, with the yoke 208 in a manner enabling it to be adjusted lengthwise so as to vary the length between the under side of the collar 293 and the point of pivotal connection between the yoke 208 and the second arm of the rocker 207. Thus by turning the connecting-rod 209 so as to screw its lower end into or out of the yoke 208 the paster may be adjusted vertically so as to cause it to work properly with relation to the paste-pan and to the under surface of the bottom blank in the hopper. A jam-nut 281 is applied to the threaded end of the connecting-rod to provide against accidental loss of adjustment.

The paster is shaped suitably to apply the paste or other cementitious material to the under side of the bottom blank of the stack of blanks that is contained in the hopper along the lines on which it is desired that the said blank shall be caused to adhere to the box body or shell. The illustrated form of paster 20 (see Figs. 8, 9, and 10) is intended for employment in applying bottoms to rectangular bodies in the manufacture of French-edge boxes. The upper edge thereof, which is the paste-applying portion thereof, in contour corresponds substantially with the contour of a box-body and is four-sided in order to enable it to apply the paste or the like along all four sides of the bottom blank. For applying paste to end blanks the paster will be formed with paste-applying edges along three sides thereof. The paster is by preference formed in one piece, and when the shape or size of the box which is to be produced varies a paster corresponding in shape and size is introduced into the machine. For the purpose of enabling the paster conveniently to be connected with the vertically-reciprocating carrying-rods 201 201 therefor with capacity for ready removal, whereby the substitution of a different paster is facilitated, the respective end portions of the paster are provided with holes or sockets 271 271, two in number, upon each of the said end portions. These holes or sockets receive pins 272 272, that are carried by blocks 273 273, which are attached to the lower ends of the said vertically-reciprocating rods 201 201. The pins connected with each rod extend inwardly toward the middle of the width of the machine. Hence the pins of the two rods project toward each other. (See Figs. 8 and 9.) In order to attach the paster to the vertically-reciprocating rods 201 201, it is necessary simply to turn the right-and-left screw 18 so as to move the side pieces of the hopper far enough away from each other to separate the pins at the lower ends of the vertically-reciprocating rods 201 201 sufficiently to admit the paster endwise between the respective pairs of pins. When the paster occupies a position between the respective pairs of pins, with its holes or sockets in line with the corresponding pins, it is necessary simply to turn the right-and-left screw so as to cause the side pieces of the hopper to move toward each other. This movement of the side pieces will cause the pins to enter the holes or sockets at the opposite ends of the paster, thereby connecting the paster with the rods. Other and equivalent separable forms of couplings for the paster and its carrying-rods 201 201 may be employed, if desired.

The feeder, by means of which the bottom blank of the stack of blanks which is contained in the hopper is fed forward into position between the head or platen and form, comprises in the present instance a bar 21, Figs. 2, 4, 11, and 22 and 23, Sheet 3, extending horizontally in a direction from front to rear in the machine and fitted to guides upon the fixed frame of the machine within which it is capable of moving endwise in the said direction. The front end of the said bar is furnished with small blocks 211 211, Figs. 11 and 22, rising therefrom at the opposite sides of the feeder and on which rests the forward portion of the blank which is being fed forward from the hopper into position between the head or platen and form. To the said bar is applied a second bar 212, having at its front end a shoulder 213, Fig. 22, for engagement with the rear edge of the bottom blank of the stack of blanks in the hopper. This second bar 212, as shown in Fig. 23, Sheet 3, is formed with a dovetailed groove fitting a dovetail portion 214 of the main feed-bar 21, such dovetail portion extending longitudinally of the latter. The bar 212 is adapted to be shifted longitudinally upon the main feed-bar 21 in order to enable the shoulder 213 to be adjusted to suit the width of the blanks, and after the bar 212 has been given the desired position of adjustment upon the main feed-bar 21 it is held fixedly in such position by means of a screw 215, which is fitted to a threaded hole that is tapped vertically through the body of the feed-bar, the said screw acting by its upper end against the under side of the bar 212. When this screw is turned or tightened against the bar 212, it binds the latter in place upon the main feed-bar 21. The feeder is actuated from the main or cam shaft 7 through connections which in the present instance comprise an eccentric 216, Fig. 2, which is fast upon the said shaft, an eccentric-strap and connecting-rod 217, a lever 218, and a connecting-rod 219. The connecting-rod 219 joins the outer end of the bar 21 to the upper extremity of the lever 218. The said lever is pivotally mounted at 2181 upon a stand 2182, which latter extends rearwardly from the spider. The upper extremity of the strap and connecting-rod 217 is joined pivotally to a short forward extension of the lever 218.

In applying bottoms to the bodies of boxes it is desirable that a bottom should be attached to a box-body by means of a substantially continuous line of paste extending around the box-body. With the object in view of enabling a substantially continuous line of paste to be applied to a bottom blank, I form the forward end of the feeder-bar 21 with separate narrow arms 2112 2112, as indicated in Figs. 11 and 12, Sheet 6, and Fig. 22, Sheet 3, and with an intervening space or opening 2113, Fig. 11, between the said narrow arms, and I also construct the paster 20 with portions 2001, Figs. 11 and 12, Sheet 6, to work through the said space or opening, as indicated in Figs. 11 and 12. The actuating means for the paster is caused to raise the latter into contact with a blank in the hopper when the feeder is in a retracted position, and in the rising movement of the paster the portions 2001 2001 thereof rise through the space 2113 between the arms of the feeder. It is important that during the forward movement of the feeder the blank which is being fed forward thereby should be prevented from rising at its rear edge from engagement with the shoulder 213. I therefore employ the presser-foot arrangement which is shown separately in Figs. 20 and 21 of Sheet 3 of the drawings. The said presser-foot arrangement is applied in connection with the head or platen 17ª and comprises a plurality of bars 22 22, in the present case two, that are spaced at a convenient distance apart and work vertically within grooves or recesses 23 23, which are formed in the under side of the head or platen. The length of the bars 22 22 and the grooves or recesses in which they are contained extends in a direction from front to rear in the machine. Each bar 22 is connected with the head or platen 17ª by means of pins 221 221, which are attached to such bar and pass upward through holes extending to the upper side of the head or platen 17ª. Above the head or platen cotter-pins or the like 222 222 are passed through transverse holes in the upper ends of the pins 221 221, in order to limit the descent of the pins and bar. The bars 22 22 are acted upon with yielding force which is secured by the employment of expanding spiral springs 223 223 to cause them to project below the under surface of the head or platen. The springs 223 223 are contained in counterbored portions of the holes in the head or platen 17ª and are compressed between the upper sides of the said bars and the inner ends of the chambers which are produced by the counterbores. In operation as a blank resting upon the feeder is carried forward by the latter from the hopper into position beneath the head or platen it is passed under the bars of the presser-foot arrangement and by the latter is held down with its rear edge in engagement with the shoulder 213 of the bar 212. In order that the bars 22 22 may not become unduly charged with paste from the pasted surfaces of the blanks with which they come in contact, the acting portion of each bar is formed of two or more narrow strips which are separated somewhat from each other and bear by their lower edges upon the upper surface of the blank that is fed into position beneath the head or platen. Between the bars 22 22 of the presser-foot arrangement the head or platen is formed with a pressing surface 178, Fig. 21, Sheet 3, that is flush with the surfaces of the said head or platen at the outer sides of the said bars. This construction is adopted in order to apply pressure to the portions of the blanks which intervene between the bars and thus insure adherence of the corresponding portion of the blank to the box-body. It will be apparent that in the closing movement of the form toward the head or platen the pressure which is applied by the form to the blank will cause the presser-foot bars to recede into the grooves 23 23. The rear end of each of the bars 22 is beveled off, as at 225 in Fig. 20, in order to facilitate the passage of the forward end of a blank beneath the bar as the blank is advanced by the feeder. For the purpose of fixing the position occupied by the front edge of a blank that has been fed in place between the form and head or platen stop-gages 226 226, Fig. 1, are attached to the front of the head or platen 17ª.

After a blank has been fed forward into place adjacent the head or platen it is held in position during the closing of the form and head or platen against each other by means of grippers which hold it against the pressing-face of the head or platen. One arrangement of these grippers is shown in Figs. 1, 2, 4, 5, and 13 to 15 of the drawings. In the said figures the grippers are shown at 24 24. They are arranged at opposite sides or ends of the form 10 transversely of the machine, as indicated best in Fig. 1. They are designed to engage with the marginal portions of the blank which has been fed into position, as aforesaid. The grippers 24 24 are constituted by upwardly-inclined arms, which at their top ends are formed to bear against the under surface of a blank. The grippers are mounted upon a carrier, which in the present instance is constituted by a bar 25 extending transversely across the machine at the front thereof. The said bar 25 is supported by slide-rods 251, to the upper ends of which it is attached, and which work vertically through guides at 252, 252, on the slide 101 formed or provided. At their lower ends the slide-rods 251 251 are connected to a cross-bar 254. The said cross-bar is in operative connection with the main or cam shaft 7 through devices which serve to communicate a vertical movement to the same and the parts which are connected therewith. The devices comprise in the present instance a cam 258, Fig. 1, on the said shaft and connections intermediate the said cam and cross-bar. In the present instance the said connections comprise a lever 257, Figs. 1 and 4, which is mounted pivotally at 142 in the stand 143, a link 258, Fig. 4, that is hung from the forward extremity of one arm of the said lever, and a post 255, Fig. 4, which is applied to the said cross-bar 254 and with which the said link is connected pivotally. The cam acts to raise the grippers toward the head or platen and they are permitted to descend by gravity. For the purpose of enabling the upward stroke of the grippers to be varied vertically, so as to adapt the grippers in their action to either thick or thin stock to a nicety, the connection between the lever 257 and the cross-bar 254 is made adjustable. The adjustment is effected in the present instance by means of the nut 255, which is applied to the lower end of the screw-threaded post 256, the said nut having a collar or flange at its upper side fitting within a way or groove in the lower side of the cross-bar, as indicated in Fig. 4, to cause the cross-bar and nut to move vertically in unison.

The location of the grippers at opposite sides of the form transversely with reference to the machine adapts the machine to be used for attaching a bottom or the like to a box-body which is closed at the bottom thereof—that is to say, a box-body comprising four sides and a bottom. In the manufacture of French-edge boxes it is intended that the grippers shall engage chiefly or wholly with the marginal portions of the bottom blank which project beyond the sides of the form. (See Fig. 16, Sheet 6, in which the box-body is designated a and the bottom is marked b.) For the purpose of fitting the machine to be used also in the production of boxes in which the bottoms or ends do not project beyond the sides of the box-body the grippers 24 may be furnished with thin projections 724 724, (shown in Figs. 14 and 15, Sheet 6,) extending therefrom toward the middle of the width of the machine. These thin projections 724 724 support the marginal portions of the bottom blank, and although they intervene between the bottom of the box-body and the said bottom blank their thickness is not great enough to occasion injury, and they are readily withdrawn by the outward movement of the grippers.

The grippers 24 24 are operated with yielding force to compress the blank against the under side of the head or platen. The yielding action is secured by interposing a spring or springs at a convenient point between the grippers and the cam for actuating the same.

After the form has closed against the blank held by the grippers the grippers are moved to disengage them from the said blank. When the machine is used in the manufacture of boxes in which the marginal portions of the bottom project around the sides of the box-body, as in Fig. 16, Sheet 6, the disengagement of the grippers from the bottom blank may be effected simply by lowering the grippers, and this I contemplate providing for in practice in some cases. In order, however, to fit the machine for the manufacture of boxes in which the bottom blank is of the same size as the body of the box, I preferably construct the machine, substantially as shown, to cause the grippers to move outward horizontally for the purpose of disengaging them from the blank. Preferably also, the horizontal outward movement of the grippers for purposes of disengagement is provided for by mounting the respective grippers pivotally in connection with the supports therefor, so as to enable them to swing in a direction outward and inward.

I will now describe the manner in which in the construction that is shown in detail in Figs. 13 and 14, Sheet 6, the yielding action of the grippers and the outward and inward movements thereof are secured. Having reference to Figs. 13 and 14, in which one of the grippers and its more immediate connections are shown detached from the rest of the machine, the lower part of the gripper 24 is formed with projections 241 241, one vertically above the other, and a vertical pivotal pin or pintle 242 is applied to these projections, its opposite ends being inserted into holes that are made vertically through the said projections and the said ends being fixed within the said holes. The portion of the pin 242 which extends between the two projections 241 241 is fitted to bearings in ears 243 243, that are located one above the other and project from a small stand or bracket 244, that is carried by the cross-bar 25. Between the ears 243 243 the pivotal pin or pintle 242 is encircled by a spiral spring 245, the lower end of which is engaged with the lower ear 243, while the upper end thereof is inserted into a hole in the pin 242. The said spring 242, acting expansively, serves to support the gripper 24 vertically, it moving the said gripper vertically with relation to the stand or bracket 244 until the lower ear 241 of the gripper is caused to engage with the under side of the lower ear 243 of the said stand or bracket 244. The said spring 245 acts also torsionally, with a tendency to swing or rotate the gripper inwardly around the axis of the pivotal pin or pintle 242. By this latter action of the spring the gripper is turned or swung invariably into its normal position, (represented in Fig. 1,) this position being fixed or determined by means of a stop-projection 246, projecting from the upper ear 241 of the gripper, and the coacting stop-projection 247 projecting upward from the stand or bracket 244. Upon the upper ear 241 of the gripper is provided a cam projection 248, and upon the upper ear of the stand or bracket 244 is provided a corresponding cam projection 249 for coaction with the said cam projection 248. In the normal position of the gripper 24, occupied by the same in the lowered position of the carrier 25, for instance, the spring 245 holds the gripper in the slightly-elevated position relative to the stand or bracket 244 which is represented in Fig. 13, with the cam projection 249 separated slightly from the cam projection 248, and the stop projection 246 against the stop projection 247. In the rise of the carrier 25 the contact of the upper end of the gripper 24 with the bottom blank which has been fed into position beneath the head or platen arrests the ascent of the said gripper, the spring 242 being compressed. A further rise of the carrier 25 will carry the inclined face of the cam projection 249 against the inclined face of the cam projection 248, and by the interaction of the said cam-faces the gripper will be swung outward, so as to disengage its working end from the marginal portion of the blank. On the descent of the carrier 25 the spring 245 will act to raise the gripper relative to the carrier 25 and its stand or bracket 244 until the lower ear 241 engages the ear 243 and will swing the gripper inward into its normal position again.

Preferably I employ the grippers 24 24 not only for the purpose of supporting the bottom blank in position against the under side of the head or platen while the form, with the box-body supported thereby, is being moved, so as to place the said box-body in contact with the said bottom blank, but to prevent or assist in preventing the bottom blank while being fed by the feeder from moving forwardly away from the shoulder of the feed-bar. In other words, I employ the grippers for preventing the blank from becoming separated forwardly from the shoulders of the feed-bar in being fed, as well as for holding the said blank in place while the box-body is moved into contact with the same. In order to secure this result, the operating-cam 258 is formed to raise the gripper-support with proper timing to cause the grippers to engage with the under surface of the blank that is being fed and to compress the said blank against the head or platen with a moderate amount of force before the completion of the feeding movement. It will thus be perceived that the final portion of the feeding movement of the bottom blank is effected by the feeder against the resistance to the advance of the blank, which is occasioned by slightly clamping the blank between the grippers and the head or platen. This resistance holds the blank firmly back against the shoulder of the feeder and prevents any tendency of the blank to move too far forward. In the operation of the machine the grippers are caused to remain in the condition just referred to by means of a dwell in the cam 258 until the two parts of the box have been united by the upward movement of the form. The cam is shaped to produce then a further upward movement of the support 25, by means of which the cam projections 248 and 249 are caused to communicate the outward swing to each of the grippers, thereby disengaging the latter from the bottom blank. The grippers are caused to remain at rest in the positions thus assumed until the form descends.

The application of forms of different lengths to the machine necessitates adjustment of the grippers in a direction transversely of the machine in order to adapt the grippers to the different lengths of forms. The said adjustment is provided for in the machine shown in the drawings by forming the cross-bar 25 with slots 525 525, Fig. 1, extending transversely of the machine and securing the stands or brackets 244 244 for the grippers to the said cross-bar by means of bolts 526 526, Fig. 1, passing through the said slots. The bolts are provided with suitable hand-nuts or thumb-nuts, as indicated in Fig. 1, which may be tightened up to clamp the stands or brackets 244 244 in the required positions upon the cross-bar 25.

A modified form of the grippers is shown in Figs. 17, 18, and 19. In these figures each of the adjustable sides 172 of the hopper has connected therewith a blank supporting and guiding strip 824, which last extends from the rear end of the side 172 forward beneath the head or platen. The opposite strips 824 support the edges of the blank which is being moved forward into position under the head or platen by the action of the feeder, and they also serve to sustain the said blank in place between the form and head or platen until the form rises close to the head or platen. The strips 824 are provided with vertical lips 825 at their outer sides to serve as guides for the outer edges of the blank. They are pivotally connected at their rear ends, as at 826, to the sides 172 of the hopper. To the forward end of each strip 824 is pivoted an arm 827, which latter extends transversely across the said strip toward the middle of the width of the machine. The arm 827 is acted upon by a spring 828, which presses the same upwardly, so as to bear its free extremity up through a notch or opening 829, Fig. 19, in the strip 824 at the inner edge of the latter. By the action of the springs 828 the arms 829 are caused to compress the bottom blank against the under side of the head or platen as the said blank is fed forward by the feeder and approaches the required position between the form and the head or platen. Transverse movement is communicated to the strips 824 for the purpose of disengaging the same and their gripping-arms 827 from the blank and subsequently restoring them to their normal position. The means of occasioning this movement may be varied in practice. Figs. 17, 18, and 19 illustrate devices providing for the actuation of the strips 824 from the rods by which the paster is carried and operated. In the said figures a lever 831 is mounted pivotally at 832 upon the side 172 of the hopper. The lower arm of the said lever 831 is loosely connected with the corresponding side strip 824. The upper arm of the lever 831 contains a cam-shaped slot 833, into which projects a pin or roll 834 on a collar 835, which is attached to the paster supporting and actuating rod 201. Through the described connections the rod 201 in its movements vertically operates the lever 831 to swing the side strip 824 transversely, so as to move the said strip and its gripping-arm 827 outward away from the edge of the bottom blank as the form closes against the head or platen and inward back into the normal position for the purpose of supporting properly the next blank when it is fed forward and enabling the gripping-arm 827 to engage therewith. When the sides 172 172 of the hopper are adjusted transversely of the machine to accommodate different sizes of blanks, they carry the side strips 824 with them, so that the adjustment of the latter is effected in unison with that of the sides 172 172.

I claim as my invention—

1. In a box-machine, the combination with the relatively immovable head or platen, a form mounted to shift out of line with said head or platen into exposed position to facilitate application of a box-body or the like thereto and subsequent removal of the box from the form, and into line with the head or platen for coaction with the latter, and mechanism to produce relative movement of said form and head toward and from each other, of pasting devices, and a feeder to feed into position between said head or platen and form the blank which is to be secured to the box-body.

2. In a box-machine, the combination with the relatively immovable head or platen, a form, mechanism to produce relative movement of said form and head or platen toward and from each other, and means to shift the form out of line with said head or platen into exposed position to facilitate application of a box-body or the like thereto and subsequent removal of the box from the form, and into line with the head or platen for coaction with the latter in uniting the said blank to the box-body, of pasting devices, and a feeder to feed into position between said head or platen and form the blank which is to be secured to the box-body.

3. In a box-machine, in combination, the relatively immovable head or platen, a receptacle for a supply of blanks, an automatic pasting mechanism for applying paste to the blanks, an automatic feeder for feeding a pasted blank into position adjacent the head or platen, a form, and actuating devices for said form to move it toward and from said head or platen and also into line with the same to coact therewith in compressing the work and out of line therewith into a position in which access thereto is unobstructed to facilitate application of work thereto and removal of the work therefrom.

4. In a box-machine, in combination, the relatively immovable head or platen, the form, the form-carrier having the form movably hung thereto, actuating means to occasion the relative movement of the form and head or platen toward and from each other, and means to swing the form upon the form-carrier into line with the head or platen to coact with the latter in compressing the work, and out of line therewith into a position in which access thereto is unobstructed to permit application of the work thereto and the removal of the same therefrom.

5. In a box-machine, in combination, the relatively immovable head or platen, a receptacle for a supply of blanks, an automatic pasting mechanism for applying paste to the blanks, an automatic feeder for feeding a pasted blank into position adjacent the head or platen, the form, the form-carrier having the form movably mounted thereon, means to move the form-carrier toward and from the head or platen, and means to shift the form upon the movable form-carrier into line with the head or platen to coact with the latter in compressing the work and out of line therewith into a position in which access thereto is unobstructed to permit application of a box-body thereto and the removal of the same therefrom.

6. In a box-machine, in combination, the relatively immovable head or platen, the form, the form-supporting post, the form-carrier having the said post movably hung thereto, means to occasion relative movement of the form and head or platen toward and from each other, and means to swing the post to place the form in line with the head or platen to coact with the latter in compressing the work, and out of line therewith into a position in which access thereto is unobstructed to permit application of a box-body thereto and the removal of the same therefrom.

7. In a box-machine, in combination, the head or platen, the form, the form-supporting post, the form-carrier having the said post movably hung thereto, a cam, toggle mechanism operated by the said cam to occasion relative movement of the form and head or platen toward and from each other, a cam, and operative connections from the latter cam to the post to swing the latter to place the form in line with the head or platen to coact with the latter in compressing the work, and out of line therewith to permit application of a box-body to the form and the removal of the same therefrom, 8. In a box-machine, in combination, the head or platen, the form, the form-carrier, means to move the form-carrier toward and from the head or platen, an actuating-bar and connections therefrom to the form having a sliding coupling to allow for the movement of the form toward and from the platen, a cam, and operative connections between the said cam and the said actuating-bar to actuate the latter to move the form into line with the head or platen to coact with the latter in compressing the work, and out of line therewith to permit application of a box-body to the form and the removal of the same therefrom.

9. In a box-machine, in combination, the head or platen, the form-carrier, means to move the form-carrier toward and from the head or platen, the form, the form-support upon the form-carrier, the bar having a sliding coupling to the form-support to allow for the movement of the form-carrier toward and from the platen, and means to actuate the said bar to shift the form-support to move the form into line with the head or platen to coact with the latter in compressing the work, and out of line therewith to permit application of a box-body to the form and the removal of the same therefrom.

10. In a box-machine, in combination, the relatively immovable head or platen, the form, means to occasion relative movement of the form and head or platen toward and from each other, means to move the form into line with the head or platen to coact therewith in compressing the work, and out of line therewith into a position in which access thereto is unobstructed to facilitate the application of work thereto and the removal of the work therefrom, and means to adjust the working position of the form relative to the head or platen.

11. In a box-machine, in combination, the relatively immovable head or platen, the form, means to occasion relative movement of the form and head or platen toward and from each other, the bar in operative connection with the form, means to operate the bar to move the form into line with the head or platen to coact therewith in compressing the work, and out of line therewith into a position in which access thereto is unobstructed to facilitate the application of work thereto and the removal of the work therefrom, and adjusting means in connection with the bar to vary the working position of the form relative to the head or platen.

12. In a box-machine, in combination, the relatively immovable head or platen, the form, means to occasion relative movement of the form and head or platen toward and from each other, a cam, and operative connections therefrom to move the form into line with the head or platen to coact with the latter in compressing the work, and out of line therewith into a position in which access thereto is unobstructed to facilitate the application of work thereto and the removal of the work therefrom, the said connections being provided with adjusting means whereby the working position of the form relative to the head or platen may be varied.

13. In a box-machine, in combination, the relatively immovable head or platen, the form, the form-carrier having the form pivotally mounted thereon, means to occasion relative movement of the form-carrier and form and the head or platen toward and from each other, means to move the form into line with the head or platen to coact with the latter in compressing the work, and out of line therewith into a position in which access thereto is unobstructed to facilitate the application of the work thereto and the removal of the work therefrom, and means for adjusting the working position of the form relative to the head or platen.

14. In a box-machine, in combination, the head or platen, the form-carrier, the form-support movably mounted upon the said form-carrier, the form, means to occasion movement of the form-carrier toward and from the head or platen, the slide-bar having a sliding coupling between the same and the form-support to allow for the movement of the latter in unison with the form-carrier, operating connections for the said slide-bar whereby the latter is actuated to move the form into and out of line with the head or platen, and means of adjustment whereby the required working position of the form may be secured.

15. In a box-machine, in combination, the head or platen, the form-carrier, the form-support movably mounted upon the said form-carrier, the form, means to occasion movement of the form-carrier toward and from the head or platen, the slide-bar having a sliding coupling between the same and the form-support, the lever by which the said slide-bar is actuated, means to actuate the said lever, and means of adjustment to secure the required working position of the form.

16. In a box-machine, in combination, the head or platen, the form-carrier, the form-support movably mounted upon the said form-carrier, the form, means to occasion movement of the form-carrier toward and from the head or platen, the slide-bar operatively connected with the form-support, the lever by which the said slide-bar is actuated, the operating-cam for the said lever, and the spring in operative engagement with the said slide-bar and acting to move the latter in opposition to the cam.

17. In a box-machine, in combination, the head or platen, the form-carrier, the form-support movably mounted upon the said form-carrier, the form, means to occasion movement of the form-carrier toward and from the head or platen, the slide-bar in operative connection with the form-support, the lever, connections from the said lever to the slide-bar having provisions for adjustment in the direction of the length of the slide-bar, and means to actuate the said lever.

18. In a box-machine, in combination, the form-carrier, the toggles connected therewith for operating the same, means to actuate the said toggles, the screw-threaded post constituting an abutment for the said toggles, the sleeve to which the said post is fitted and by rotation of which the height of the post is varied as required, the support for said sleeve having the socket within which the latter is received, and means to lock the parts from loss of adjustment.

19. In a box-machine, in combination, the form-carrier, the toggles connected therewith for operating the same, means to actuate the said toggles, the screw-threaded post constituting an abutment for the said toggles, the sleeve to which the said post is fitted and by rotation of which the height of the post is varied as required, the support for said lever having the socket within which the latter is received, and the screw engaging with the said post whereby the parts are locked against loss of adjustment.

20. In a box-machine, in combination, the head or platen, the form, means to produce relative movement of the form and head or platen toward and from each other, means to feed a blank into position between the form and head or platen, grippers by which the marginal portions of the blank thus fed are compressed against the head or platen, vertical pivots for the said grippers and means to operate the said grippers.

21. In a box-machine, in combination, the head or platen, the form, means to produce relative movement of the form and head or platen toward and from each other, means to feed the blank into position between the form and head or platen, grippers having spring-actuated members by which the marginal portions of the blank thus fed are compressed against the head or platen, and means to move the said grippers into operative position for engagement with the blank and subsequently disengage them therefrom.

22. In a box-machine, in combination, the head or platen, the form, means to produce relative movement of the form and head or platen toward and from each other, means to feed a blank between the head or platen and form, grippers outside the periphery of the form to compress the marginal portion of a blank as the latter is being fed into place, vertical pivots for the said grippers and operating devices for the said grippers.

23. In a box-machine, in combination, the head or platen, the form, means to occasion relative movement of the form and head or platen toward and from each other, means to feed the blank into position between the form and head or platen, grippers coöperating with the head or platen outside the form to act against the marginal portions of the said blank, means to adjust the said grippers toward and from each other, and operating devices for the said grippers to move the latter into operative position to engage with the blank as the latter approaches the required position.

24. In a box-machine, in combination, the head or platen, the form, means to produce relative movement of the form and head or platen toward and from each other, grippers outside the form to act against the marginal portions of a blank between the form and head or platen, a movable carrier for said grippers, and operating means for the said carrier.

25. In a box-machine, in combination, the head or platen, the form, means to produce relative movement of the form and head or platen toward and from each other, grippers outside the form to act against the marginal portions of a blank between the form and head or platen, a movable carrier for said grippers, means to adjust the grippers upon the said carrier toward and from each other, and operating means for the said carrier.

26. In a box-machine, in combination, the head or platen, the form, a gripper adjacent the exterior of the form, a carrier for the said gripper on which it is mounted with capacity for movement in a vertical direction and also for transverse movement relative thereto, means to operate the said carrier, a spring to hold the said gripper in elevated normal position with relation to the said carrier, and means in connection with the gripper and its carrier whereby on the arrest of the gripper in its movement toward the head or platen the continued movement of the carrier in that direction occasions the transverse movement of the gripper.

27. In a box-machine, in combination, the head or platen, the form, grippers adjacent the exterior of the said form, supports for the said grippers on which they are mounted with capacity for movement in a vertical direction and also for transverse movement relative thereto, means to operate the said supports, springs to hold the said grippers in elevated normal position with relation to the said supports, and means whereby on the arrest of the grippers in their movement toward the head or platen the continued movement of the supports in that direction occasions transverse movement of the grippers.

28. In a box-machine, in combination, the head or platen, the form, a gripper, a carrier for the said gripper on which the latter is mounted pivotally and also with capacity for vertical movement relative to the carrier, means to operate the said carrier, a spring applied to the carrier and acting in connection with the gripper to hold the same in elevated normal position, and means whereby when the gripper is arrested in its movement toward the head or platen it is swung pivotally in a transverse direction upon the carrier.

29. In a box-machine, in combination, the head or platen, the form, a gripper, a carrier for the said gripper on which the latter is mounted pivotally and also with capacity for vertical movement relative to the carrier, means to operate the said carrier, a spring applied to the carrier and acting in connection with the gripper to hold the same in elevated normal position, and a cam device whereby when the gripper is arrested in its movement toward the head or platen it is swung pivotally in a transverse direction upon the carrier.

30. In a box-machine, in combination, the head or platen, the form, a plurality of grippers adjacent the sides of the said form, supports for the said grippers on which they respectively are mounted pivotally and also with capacity for vertical movement relative to the supports, means to operate the said supports, springs applied to the respective supports and acting in connection with the respective grippers to hold the latter in elevated normal positions, and means whereby when the grippers are arrested in their movement toward the head or platen they are swung pivotally in a transverse direction upon the supports.

31. In a box-machine, in combination, the feeder having a shoulder for engagement with an edge of a blank to be fed, the head or platen having two or more slots or openings with intervening pressing-surfaces, the presser-feet respectively working in the said slots or openings, said presser-feet being of a thickness equal to the depth of the slots and acting against a surface of the blank to hold the blank from rising relative to the said shoulder, and means to produce relative movement of the form and head or platen toward and away from each other.

32. In combination, the paster, the carriers at the opposite ends thereof, the said paster and carriers respectively having the sockets and the projections separably engaging with each other, the supports for said carriers, means to adjust said supports toward and from each other, to engage and disengage said projections and sockets and means to operate the said carriers.

33. In combination, side guides for a stack of blanks, means to adjust the said side guides toward and from each other, a paster, rods guided by the said side guides, and means to actuate the said rods, the said rods and paster having coupling members comprising the sockets and the projections entering the said sockets and connectible and disconnectible by movement of the side guides toward and from each other.

34. In combination, the paster, the carriers at the opposite ends thereof, the supports for the said carriers, the right-and-left screw whereby the said supports are adjusted toward and from each other, and means to operate the said carriers, the said carriers and paster having coupling members comprising the sockets and the projections and connectible and disconnectible by adjustment of the supports toward and from each other.

35. In combination, the receptacle for blanks, the feeder, means for actuating the feeder, the paster, and actuating connections for positively operating the paster embracing as an element thereof the spring to yield to prevent breakage in case the movement of the paster in applying paste to the blank is obstructed by the feeder.

36. In a box-machine, in combination, the relatively immovable head or platen, a receptacle for blanks, paste-applying devices, means to feed a blank from said receptacle into position adjacent the head or platen, a form movable from its normal position into an unobstructed position out of line with the said head or platen when separated therefrom to facilitate the application and removal of box-bodies and the like, and means to operate said form.

37. In a box-machine, in combination, the relatively immovable head or platen, a receptacle for blanks, paste-applying devices, means to feed a blank from said receptacle into position adjacent the head or platen, a form mounted to move from its normal position with relation to the said head or platen into an unobstructed inclined position when separated therefrom to facilitate the application and removal of box-bodies and the like, and means to operate the said form.

In testimony whereof I affix my signature in presence of two witnesses.

EUGENE H. TAYLOR.

Witnesses:
CHAS. F. RANDALL,
WILLIAM A. COPELAND.